C. J. SEVIN.

Apparatus for the Manufacture of White Lead.

No. 5,938. Reissued June 30, 1874

Witnesses:
A. H. Norris
George Cushing Jr.

Inventor:
Charles J. Sevin
By his attorneys
Van Santwood & Cauff.

BEST AVAILABLE COPY

UNITED STATES PATENT OFFICE.

CHARLES J. SEVIN, OF WAVERLY, NEW JERSEY.

IMPROVEMENT IN APPARATUS FOR THE MANUFACTURE OF WHITE LEAD.

Specification forming part of Letters Patent No. 151,165, dated May 19, 1874; reissue No. 5,938, dated June 30, 1874; application filed June 19, 1874.

*To all whom it may concern:*

Be it known that I, CHARLES J. SEVIN, of Waverly, in the county of Essex and State of New Jersey, have invented a new and useful Improvement in Apparatus for the Manufacture of White Lead, of which the following is a specification:

This invention is illustrated in the accompanying drawing, in which—

Figure 1:
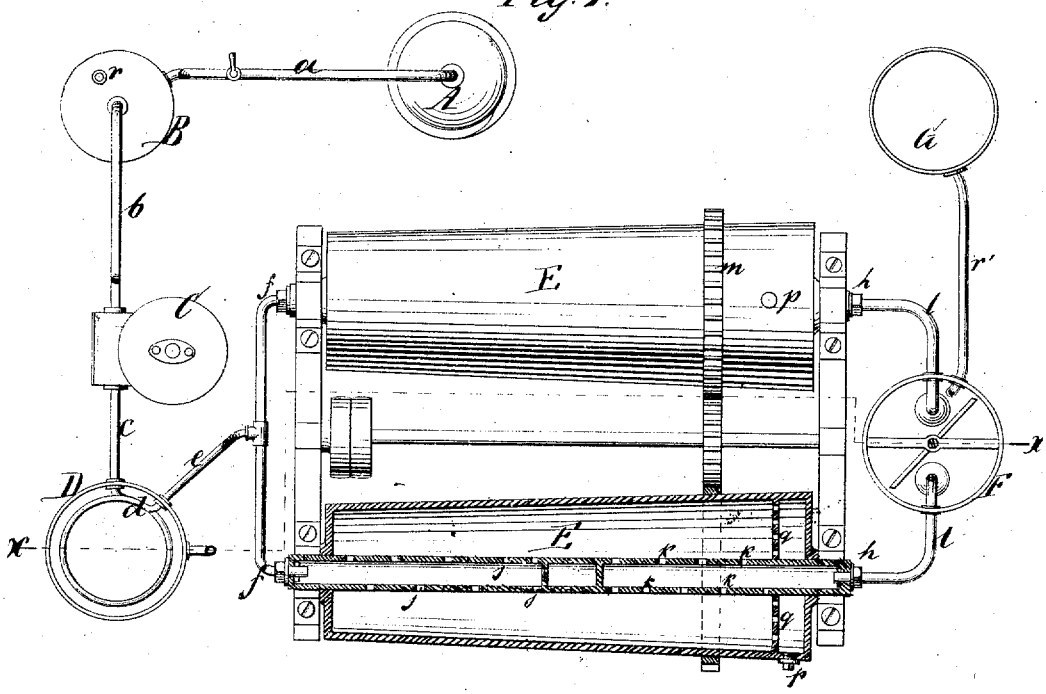
Figure 2:
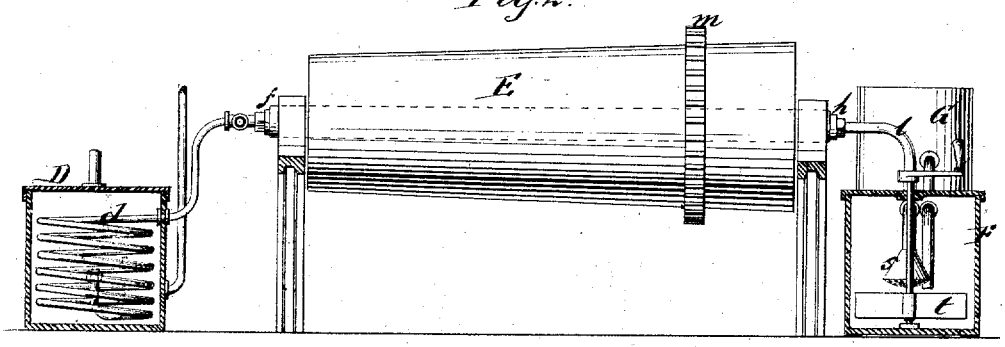

Figure 1 represents a sectional plan of my apparatus. Fig. 2 is a longitudinal vertical section of the same in the plane *x x*, Fig. 1.

Similar letters indicate corresponding parts.

This invention relates to an apparatus for the manufacture of white lead, in which two revolving drums are employed, which are supplied with granulated lead, and through which is passed a current of heated air, for the purpose of oxidizing the lead; then the drums are charged with acetic acid, which absorbs the oxide of lead, and finally a current of carbonic acid is passed through said drums, whereby carbonate of lead is formed. By heating the air the oxidizing effect is increased, and the carbonic acid may also be heated for the purpose of facilitating the decomposition. The carbonic acid is produced by burning coke or other suitable material in a furnace, and a pump serves to draw the same from the furnace through a purifier, and to force it through a coil into the corroding-drums. The surplus carbonic acid passes from the corroding-drums into a mixer, which is supplied with a solution of acetate of lead from a stationary corroding-vat.

In the drawing, the letter A designates a furnace, in which is produced carbonic acid by burning coke or other suitable material. The carbonic acid thus produced is impure, and in order to purify it I pass it through one or more purifiers, B. Each purifier is filled with pure water, or other suitable material, which is introduced through an aperture, *r*, in its top, and from the bottom or side of said purifier extends a pipe, *a*, to the top of the furnace, while a pipe, *b*, which emanates from the top of said purifier, connects with the suction-port of a double-acting force-pump, C. The exhaust-port of this pump connects, by a pipe, *c*, with a coil, *d*, situated in the interior of a heater, D, which is heated by steam or otherwise. When the pipe *a* is open and the aperture *r* is closed, the carbonic acid is first drawn from the furnace through the purifier or purifiers, and then it is forced, through the coil *d* and a pipe, *e*, into two drums, E E; said pipe *e* being made to spread in two branches, each of which passes into the hollow gudgeon *f* of one of the drums. The gudgeons *f f*, at the receiving ends of the drums, connect by pipes *g g*, extending through the entire length of the drums, with the discharge gudgeons *h h*, and in these pipes are partitions, *i*, (see Fig. 1,) and with holes *j k* on each side of these partitions, so that the carbonic acid admitted through the gudgeons *f f* will escape through the holes *j* into the drums, and the surplus carbonic acid which is not used up in said drums passes through the holes *n* to the discharge-gudgeons *h h*. From these gudgeons extend pipes *l l* to the mixer F, the object of which will be presently more fully explained. The drums E E are conical, being largest at the ends supported by the discharge-gudgeons *h h*, and they are geared together by cog-wheels *m n*, the cog-wheel *n* being mounted on a shaft, *o*, to which a revolving motion is imparted by steam or other suitable power. Each drum is provided with a discharge-opening, *p*, near its large end, and these discharge-openings are separated from the remaining spaces of said drums by perforated partitions or sieves *q*.

The metallic lead from which the white lead is to be manufactured is granulated by casting it in small pieces, like shot; it is then placed into the drums E, and a suitable quantity of vinegar or diluted acetic acid is added to moisten the lead, and while the drums revolve a current of heated air is forced through each of said drums. By the acetic acid and heated air the lead is caused to corrode, and acetate of lead is formed; then a quantity of acetic acid is filled in each drum, which, on coming in contact with the oxide of lead, dissolves the same; then I introduce a current of carbonic acid, which decomposes the acetate of lead and forms carbonate of lead, which, being insoluble in the liquid contained in the drums, is precipitated and caused to accumulate in the large ends of the drums, the metallic lead being prevented by the sieves *q* from passing to said large ends. At suitable intervals the white lead, together with the liquid, is drawn off from the drums; the white lead is allowed to precipitate, and the lead is then again corroded by the action of the currents of heated air, which are drawn in through the aperture *r* in the purifier, and forced by the pump C through the heating-coil *d* into the drums; and when the lead in the drums is sufficiently corroded or oxidized, said drums are again charged with acetic acid, and the process is repeated, as previously described. The surplus carbonic acid, or that portion of the carbonic acid which does not combine with the lead in the drums E E, passes off through the holes *k* in the pipes *g g*, and through the pipes *l l* into the mixer F, which communicates, by a pipe, *r'*, with the corroding-vat G. This vat is filled with granulated lead and diluted acetic acid, and the liquid acetate of lead formed therein is allowed to pass into the mixer F, where it is brought in contact with the carbonic acid escaping from the pipes *l l*. These pipes are provided with rose-heads, *s*, at their discharging ends, (see Fig. 2,) so that the carbonic acid is spread and brought in intimate contact with the liquid; and in the mixer is an agitator, *t*, which serves to facilitate the contact of the carbonic acid with the liquid.

By this apparatus I am enabled to convert metallic lead into white lead in less than eight hours; and the cost of the process is comparatively little, since the acetic acid can be used over and over again for a long time.

What I claim as new, and desire to secure by Letters Patent, is—

1. In an apparatus for the manufacture of white lead, the combination of a carbonic-acid generator, one or more purifiers, a pump, a heater, and two or more revolving drums, receiving and discharging carbonic acid and heated air through their hollow gudgeons, and provided with sieves to prevent the metallic lead from passing off with the liquid, all constructed and operating substantially in the manner and for the purpose herein shown and described.

2. The combination of a mixer, F, and a corroding-vat, G, with pipes *l l*, through which escapes the surplus carbonic acid from the drums E E, substantially as set forth.

In testimony that I claim the foregoing I have hereunto set my hand and seal.

CHARLES JULIUS SEVIN. [L. S.]

Witnesses:
W. HAUFF,
E. F. KASTENHUBER.